United States Patent

Johansson et al.

[11] Patent Number: 5,986,539
[45] Date of Patent: Nov. 16, 1999

[54] HAFE-DUPLEX TWO-WIRE DC POWER-LINE COMMUNICATION SYSTEM

[75] Inventors: Fritz H. Johansson, Mesa, Ariz.; Gordon P. Hampton, Cupertino, Calif.

[73] Assignee: Ultracision, Inc., Santa Clara, Calif.

[21] Appl. No.: 09/093,964

[22] Filed: Jun. 8, 1998

[51] Int. Cl.$^6$ .................................................. H04M 11/04
[52] U.S. Cl. .................... 340/310.01; 340/538; 340/539; 340/825.07; 307/106
[58] Field of Search ................... 340/310.01, 825.07, 340/539, 657, 538; 370/463, 357, 215, 276, 477; 307/106

[56] References Cited

U.S. PATENT DOCUMENTS

| | | | |
|---|---|---|---|
| 3,917,916 | 11/1975 | Ghosh et al. | 340/310.01 |
| 4,413,250 | 11/1983 | Porter et al. | 340/310.01 |
| 4,427,974 | 1/1984 | Sheahan | 340/539 |
| 4,459,582 | 7/1984 | Sheahan et al. | 340/539 |
| 4,568,909 | 2/1986 | Whynacht | 340/21 |
| 4,788,527 | 11/1988 | Johansson | 340/310 |
| 4,926,158 | 5/1990 | Zeigler | 340/310 |
| 5,424,709 | 6/1995 | Tal | 340/310.01 |
| 5,614,811 | 3/1997 | Sagalovich et al. | 323/207 |

OTHER PUBLICATIONS

Keyence Sensors for Factory Automation, New, Super–Micro PLC with Advanced, Remote I/O . . . It's the Worlds Smallest, Fastest and Lowest in Cost, product ad, Mar. 1998, pp. 1–3.

*Primary Examiner*—Edward Lefkowitz
*Assistant Examiner*—Davetta Woods
*Attorney, Agent, or Firm*—Thomas E. Schatzel; Law offices of Thomas E. Schatzel A Prof. Corporation

[57] ABSTRACT

A powerline communication system comprises a master and slave configuration in which the master provides both operating power and control commands to the slave over a single pair of wires. The slave, in turn, is able to communicate its status to the master with a return communications channel on the same pair of wires. Each sender impresses its signals on the power lines with an isolation transformer coupled to the gate of a power MOSFET transistor that shunts the power lines. Each receiver samples the signals from the sender with an isolation transformer that has its primary winding placed in series with the power lines. The master initiates a synchronizing pulse and places data in various timeslots. The slave follows with an initiating sync pulse followed by data in a group of timeslots. Edge-detection, rather than level-detection is used at the receivers for added immunity to supply and load changes. A double-pulse sync is used for special time slot reporting.

6 Claims, 4 Drawing Sheets

HAFE-DUPLEX TWO-WIRE DC POWER-LINE COMMUNICATION SYSTEM

1. FIELD OF THE INVENTION

The present invention relates to supervisory control and data acquisition (SCADA) systems, and more particularly to remote sensing and control of equipment via their power lines.

2. DESCRIPTION OF THE PRIOR ART

Fritz H. Johansson describes an apparatus and method for device control using a two conductor DC power line in U.S. Pat. No. 4,788,527, issued Nov. 29, 1988. A power supply for a plurality of remote devices and sensors injects control signals into the power lines that the remotes are equipped to respond to. An initializing control signal defines and synchronizes a plurality of time intervals that follow the initial sync pulse. Each such remote unit can return a status signal back on the same power line during a time interval reserved for that purpose. The power conductors alone are all that is necessary to communicate control information and sensor data between a controller and a remote.

John R. Zeigler was issued U.S. Pat. No. 4,926,158, on May 15, 1990, for a powered communications link between a central controller and a mobile remote. Data and power are multiplexed over a pair of power conductors for the mobile remote by the central controller. The power and data are sent one at a time. During the data transmission period, continues power is supplied to the mobile remote by a battery, large capacitor, or other storage device. The system is directed at applications where the mobile remote rides on rails or commutator slip rings, e.g., trains, motors, print heads on tracks, etc.

U.S. Pat. No. 5,614,811, for a "Power line control system", was issued to Emil Sagalovich, et al., on Mar. 25, 1997. A system and method is described for controlling electrical devices connected to AC power lines with control signals transmitted over the AC power line. The system includes a transmitter that generates multiple voltage pulses during half cycles of the AC power line voltage which act as control signals for a "slave" device. The receiver in the slave decodes the voltage pulses and can control the remote device's operation.

The prior art also includes systems that concentrate many input/output (I/O) channels into a single twisted pair, but allow the power lines to be run separately. For example, Keyence (Osaka, Japan) markets commercial industrial products that interconnect many input/output devices with a single twisted pair wire connection. Such products are used for sensors and control systems in factory automation. The Keyence KV-300 series is marketed as including an advanced remote I/O concept to significantly reduce the amount of wiring and simplify programming for programmable logic controllers (PLC's). Up to 1774 I/O ports can be scanned in 500 $\mu$S using a single twisted pair to connect all I/O modules. The KV-300 modules include a serial interface, analog I/O interface with D/A and A/D, and a range of remote I/O module configurations for specific applications. The KV-300 is summarized as a wire-saving remote I/O connection system with all the I/O channels collectable into a single twisted pair, e.g., up to 1774 I/O channels. A simplified I/O addressing uses a common address for all I/O modules with no address changes when reconfigurations are required. The KV-300 CPU has fourteen I/O ports that are expandable to the mentioned 1774 I/O ports. An advantage stated is that the system conserves control panel space. A "unique, innovative latching mechanism quick-connects" all the I/O modules together on a DIN rail. The KV-300 Remote I/O modules each have eight or sixteen I/O channels, and can be connected anywhere in the network with a single twisted pair. Since the amount of wire and setup labor is significantly reduced over previous methods, large networks can be constructed quickly and at lower cost. The KV-AN6 analog I/O module has both A/D and D/A functions in a single "plug-in" module, and interfaces analog data from Keyence sensors and other measuring instruments directly to the KV-300 CPU. Alternatively, the analog output from the KV-AN6 can be used to control servo motors, and other external devices, using input data from a sensor. A single instruction lets users calculate average measured values and compare them to user defined maximum/minimum values. The KV-L2 serial interface provides two RS-232/422A ports for communications between the PLC and a personal computer. The KV-L2 can control instrumentation while simultaneously reading output data from the instrument. A KV-L2 module interfaced to a KV-300 CPU enables a personal computer to communicate with the KV-300 CPU for program editing and monitoring of PLC operation Keyence's DOS ladder software, INCREDIWARE.

Commercial products that were built according to the Fritz H. Johansson invention have been installed in many applications. However, an improvement is needed that permits a wider range of power line voltages, higher power levels and data rates. The signal generating circuit 14 described in FIGS. 1 and 3 of the Fritz H. Johansson U.S. Pat. No. 4,788,527, used a bipolar transistor switch 31 behind a choke 32 to induce communication pulses on the power lines. The switch was therefore not isolated. At the receiver 20, a blocking diode was typically used to rectify and block the pulses on line 46 from the load 52. It was discovered that conducting semiconductor diodes have a switch recovery time characteristic that was absorbing pulses on the line and preventing good control signal detection. And the higher the current through the diode in the remote load, the worse was the ability of the system to maintain its communication link.

SUMMARY OF THE INVENTION

It is therefore an object of the present invention to reduce the effect of line length between master and slave.

It is a further object of the present invention to provide a powerline communication system that is independent of the voltages and powers used by the supply-load side of the network.

It is a still further object of the present invention to provide a powerline communication system that is affordable and easy to manufacture.

It is a further object of the present invention to provide a powerline communication system that is compatible with prior art systems and methods.

Briefly, a powerline communication system embodiment of the present invention comprises a master and slave configuration in which the master provides operating power and initiates control commands to the slave over a single pair of wires. The slave, in turn, is able to communicate its status to the master with a return communications channel on the same pair of wires. Each sender impresses its signals on the power lines with an isolation transformer coupled to the gate of a power MOSFET transistor that shunts the power lines. Each receiver samples the signals from the sender with an isolation transformer that has its primary winding placed in series with the power lines. The master initiates a synchronizing pulse and places data in various timeslots. To avoid master and slave talking simultaneously (full duplex) the master always initiates communication and the slave then responds. The slave needs to know the time of each burst (number of time slots) from the master before it responds. The slave can return data in another group of timeslots. Edge-detection, rather than level-detection is used at the receivers and master for added immunity to supply and load changes. A double-pulse sync is used for special time slot reporting.

An advantage of the present invention is that a powerline communication system is provided in which the sending and receiving units are electrically isolated from the power lines and can therefore be simplified over prior art systems.

Another advantage of the present invention is that a powerline communication system is provided that operates reliably over a wide range of power and load conditions and line lengths.

These and other objects and advantages of the present invention will no doubt become obvious to those of ordinary skill in the art after having read the following detailed description of the preferred embodiments which are illustrated in the various drawing figures.

IN THE DRAWINGS

DETAILED DESCRIPTION OF THE PREFERRED EMBODIMENT

Figure 1:
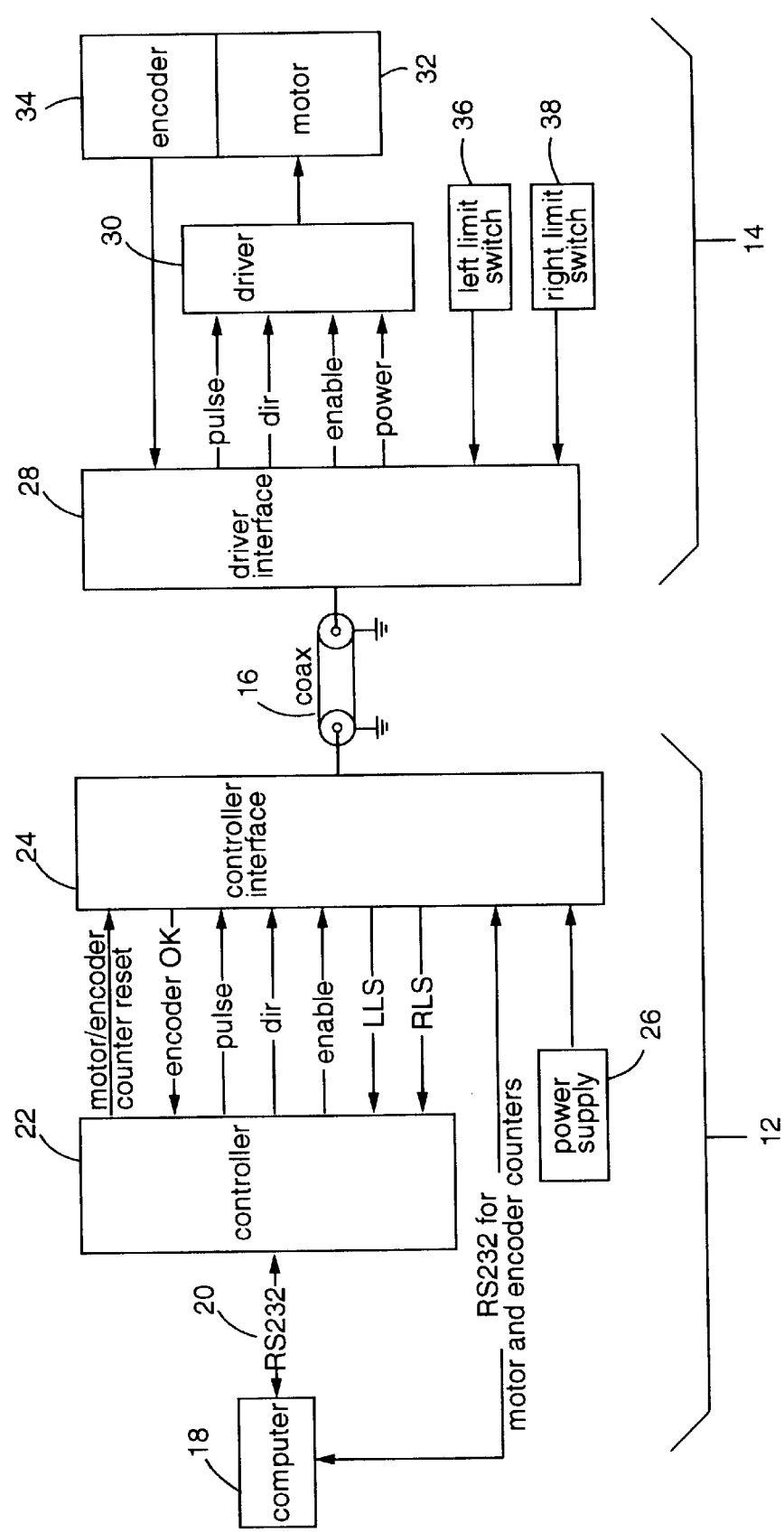
FIG. 1 is a functional block diagram of motion control system embodiment of the present invention with powerline communication.

A motion control system embodiment of the present invention with powerline communication is illustrated in FIG. 1, and is referred to herein by the general reference numeral 10. The system 10 comprises a master 12 connected to a slave 14 with a single coaxial cable 16. A computer 18 is connected with an RS-232 serial communications channel 20 to a controller 22. Alternatively, the computer 18 and controller 22 combination can comprise a standalone programmable logic controller (PLC), such as the Galil Motion Control, Inc. (Santa clara, Calif.) model DMC-1500. A controller interface 24 combines power and signals and input/output (I/O) signals to the coax 16 from the controller 22 and a power supply 26. It is expected that such a system would be capable of placing thousands of signals on the coax connection to the slave 14. A driver interface 28 demultiplexes the signals and separates the power from the signals on the coax 16 and provides stepper pulses, direction signals, enablement control, and power directly to a driver circuit 30 that is preferably very closely located next to a motor 32. Stepper, linear, DC servo and voice coil motors can all be used for motor 32 with appropriate selections of power, control signals, and a driver circuit 30. A feedback signal, in this case a shaft encoder 34, is connected to a reverse channel that is communicated back over the coax 16 to the computer 18. A pair of limit switches 36 and 38 also illustrate the other kinds of sensors that can be instrumented in a motion control system of the present invention.

Figure 2:
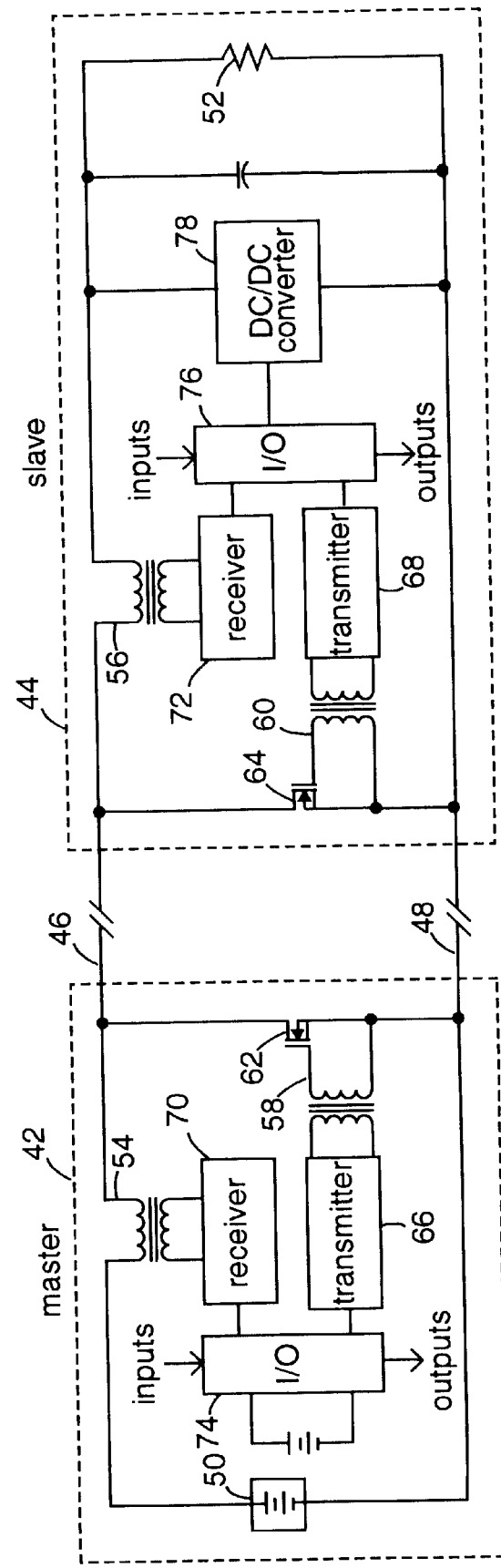
FIG. 2 is a functional block diagram of the powerline communication system included in FIG. 1.

FIG. 2 shows a powerline communication system 40 in which a master 42 communicates with a slave 44 over a pair of power supply wires 46 and 48. A direct current (DC) power source 50, such as a battery, is connected through to power a load 52. A pair of communication receiver isolation transformers 54 and 56 are placed with their primary windings in series with one of the power supply wires 46 and 48. DC current flow around the loop is relatively unimportant to the communication function of the system, and so such do not appear at the secondary windings. A pair of communication transmitter isolation transformers 58 and 60 are respectively connected to drive the gate inputs of a pair of MOSFET power transistors 62 and 64 with their drains and sources connected across the power supply wires 46 and 48. A secondary winding of each of these transformers respectively couples the MOSFET power transistors 62 and 64 to a matching pair of transmitters 66 and 68. The communication receiver isolation transformers 54 and 56 are similarly connected to a pair of matching receivers 70 and 72. An I/O channel multiplexer/demultiplexer 74 sends and receives data through the intervening receivers and transmitters to a similar I/O channel multiplexer/demultiplexer 76 at the slave unit. Analog and digital inputs presented to the I/O channel multiplexer/demultiplexer 74 are converted, transmitted, and reconstituted at the outputs of the I/O channel multiplexer/demultiplexer 76, and vice versa. The slave receiver, transmitter and I/O channel multiplexer/demultiplexer are powered by an isolated DC/DC power converter 78.

The communication between the master and slave over the power lines can be carried out using any number of carrier and baseband communications technologies. A baseband system that works well is described by Fritz H. Johansson in U.S. Pat. No. 4,788,527. This system uses a synchronizing pulse to signal the start of time slot reporting between master or slave. The embodiments of the present invention preferably use baseband communication such as this because the commercial and industrial implementations have proven themselves to be inexpensive and easy to manufacture, and are robust and relatively noise immune. Tests that were conducted in the extremely noisy environment of a microwave-driven plasma generator verified such noise immunity. Signals communicated between the master and slave have source impedances under $0.5\Omega$ and average voltage levels of 25 V.

Prior art systems such as described by Fritz H. Johansson had to use relatively wide pulses at their baseband transmitters because the received pulses would tend to be narrowed by operating the loads in the higher power ranges. Since the use of the isolation transformers 54, 56, 58, and 60 alleviates this problem, the embodiments of the present invention preferably use pulse widths under a microsecond in duration. As a consequence, the power MOSFET transistors 62 and 64 can be much smaller and lower power dissipation types than required in the prior art. Transformers 54, 56, 58, and 60 can also be made smaller. The isolation transformers 54 and 56 can be implemented as power inductors with a few turns secondary to decouple the pulse information from off the two-wire lines 46 and 84. A secondary benefit is the isolation that it provides. The present invention also preferably uses edge-triggered detection in the receivers 70 and 72. Prior art systems used level-triggered detectors that were sensitive to and adversely affected by operational variations in the power source in the master and the load in the slave.

Figure 3:
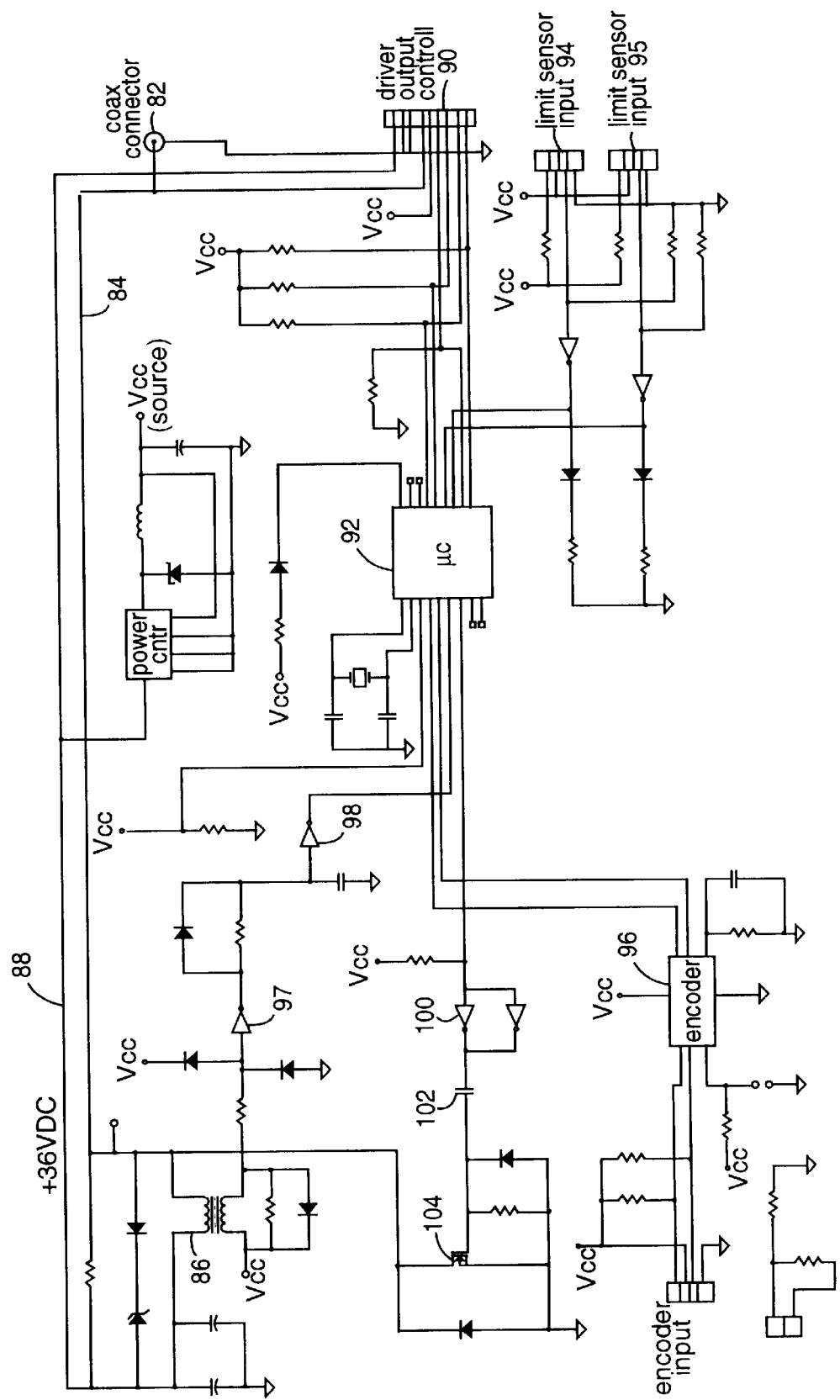
FIG. 3 is a schematic diagram of a powerline communication system slave embodiment of the present invention included in FIGS. 1 and 2.

FIG. 3 represents a slave interface 80 that is similar to the driver interface 28 in FIG. 1. The slave interface 80 connects to a master via a coax connector 82. A wire 84 connects this to a receiver isolation transformer 86 and the power feed continues on with a wire 88. A driver circuit and motor are connected externally to a parallel connector 90. A microcomputer 92, for example a type-89C2051, processes digital control inputs and outputs to the parallel connector 90. Motion controller inputs are received from a pair of limit sensor inputs at connectors 94 and 95. A shaft encoder input is processed by an LS7083-type device 96. Baseband pulses developed in the transformer 86 as a result of a master's transmitter operating, are signal conditioned by a series of inverters 97 and 98 for input to the microcomputer 92. The slave interface 80 produces its baseband output signals for the master by a channel that leads from the microcomputer 92 through an inverter pair 100, a blocking capacitor 102, and an output switching transistor 104. Such output transistor can be an industry type ZVN4210.

In this case, the slave interface 80 does not use the communication transmitter isolation transformer 60 described for FIG. 2. In the implementation shown in FIG. 3, the slave interface 80 is referenced to power ground. In applications where this is not desirable or possible, then the transmitter isolation transformer 60 would be necessary. The receiver isolation transformers 54 and 56 are always used.

Figure 4:
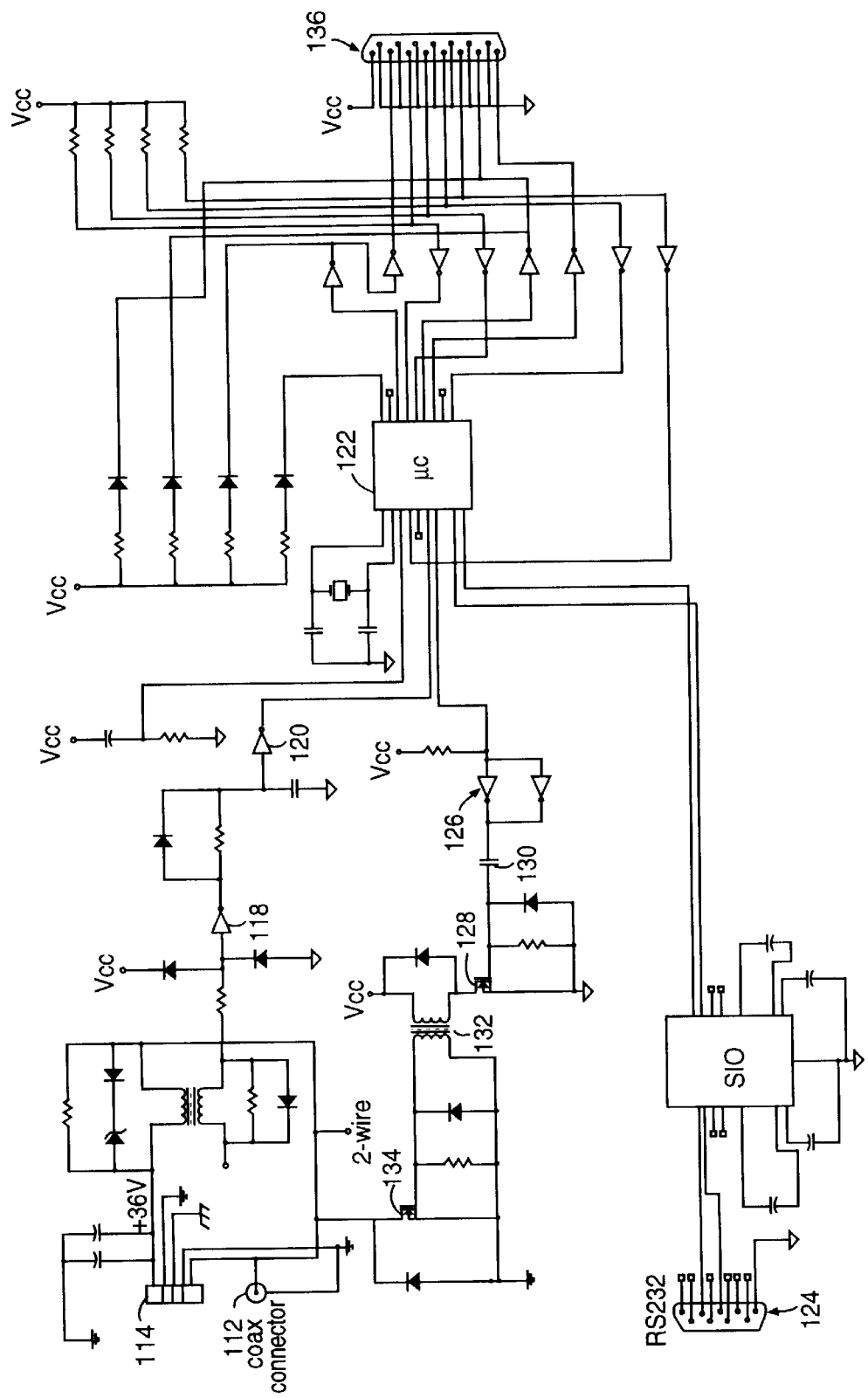
FIG. 4 is a schematic diagram of a powerline communication system master embodiment of the present invention included in FIGS. 1 and 2 and is the complement to the slave shown in FIG. 3.

FIG. 4 represents a master interface 110 that is similar to the controller interface 24 in FIG. 1. The master interface 110 has a coax connector 112 that interfaces with the coax input 82 at the slave interface 80. DC power to operate the system is received at a terminal 114 and passes through a receiver isolation transformer 116 on its way to the slave interface. Any signal pick-up is signal conditioned through a series of receiver inverters 118 and 120 for input to a microcomputer 122, for example a type-89C2051. The microcomputer 122 supports an RS-232-type serial interface 124 that is similar to the RS-232 serial communications channel 20 in FIG. 1. The transmitter circuit, e.g., transmitter 66 in FIG. 2, is implemented with an output port from the microcomputer 122 that drives a buffer pair 126 and a first-stage switching transistor 128 through a capacitor 130. This in turn drives a transmitter isolation transformer 132 and power MOSFET transistor 134 that are the functional equivalents of transformer 58 and transistor 62 in FIG. 2. A parallel I/O channel to a controller such as controller 22 in FIG. 1 is supported by the microcomputer 122 at a D-shell connector 136.

The advantage of implementing the master-slave combination as shown in FIGS. 3 and 4 is that the baseband communication method chosen can be entirely implemented and tuned with software changes to the microcomputers 92 and 122. The edge-detection of received signals is implemented by software routines that look for a state transition at an input pin. Some microcomputer types include edge-triggered interrupt pins and that may be useful in some applications where the program cannot monitor the input pin tight enough.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit.and scope of the invention.

What is claimed is:

1. A powerline communication system, comprising:
a first station that continuously supplies operating power to a remotely located second station over a two-wire interconnecting circuit;
an isolation transformer with a primary winding connected in series with said two-wire interconnecting circuit and providing a baseband receiver signal output in a secondary winding;
a switching transistor connected across said two-wire interconnecting circuit and providing for an intermittent shunting of said operating power with pulse durations and pulse repetitions that produce a corresponding signal in said secondary winding;
an input multiplexer for receiving a plurality of data signals into a single sequence of patterned pulses connected to an input gate of the switching transistor; and
an output demultiplexer connected to receive a signal from said secondary winding of the isolation transformer and providing for a reconstruction of an original data presented on each of said plurality of data channels.

2. The system of claim 1, further including:
a transmitter isolation transformer connected between the switching transistor and the input multiplexer and providing for electrical isolation of the two-wire interconnecting circuit from the input multiplexer.

3. The system of claim 1, wherein:
the first station includes one each of the input multiplexer and switching transistor; and
the remotely located second station includes one each of the output demultiplexer and receiver isolation transformer in continuous communication with the master unit via said two-wire interconnecting circuit.

4. The system of claim 3, wherein:
the remotely located second station includes one each of the input multiplexer and switching transistor; and
the first station includes one each of the output demultiplexer and receiver isolation transformer in continuous communication with the slave unit via said two-wire interconnecting circuit;
wherein a continuously operating half-duplex communication channel is established without interference to a transfer of operating power from the first station to the remotely located second station.

5. A motion control system with powerline communication, comprising:
a programmable logic controller with a plurality of input and output channels programmed for motion control of a driver and stepper motor;
a master interface for continuously supplying operating power to said driver and stepper motor at a remote location over a two-wire interconnecting circuit;
a first isolation transformer located at said driver and stepper motor and including a primary winding connected in series with said two-wire interconnecting circuit and providing a baseband receiver signal output in a secondary winding;
a first switching transistor located at the master interface and connected across said two-wire interconnecting circuit and providing for an intermittent shunting of said operating power with pulse durations and pulse repetitions that produce a corresponding signal in said secondary winding;

a first input multiplexer located at the master interface and for receiving a plurality of data channels from the programmable logic controller and converting them into a single sequence of patterned pulses connected to an input gate of the first switching transistor; and a first output demultiplexer located at said driver and stepper motor and connected to receive a signal from said secondary winding of the first isolation transformer and providing for a reconstruction of an original data presented on each of said plurality of data channels;

wherein the programmable logic controller is provided with two-wire control of the driver and stepper motor.

6. The system of claim 5, further comprising:

a second isolation transformer located at said master interface and including a primary winding connected in series with said two-wire interconnecting circuit and providing a baseband receiver signal output in a secondary winding;

a second switching transistor located at the driver and stepper motor and connected across said two-wire interconnecting circuit and providing for an intermittent shunting of said operating power with pulse durations and pulse repetitions that produce a corresponding signal in said secondary winding;

a second input multiplexer located at the driver and stepper motor and providing for sensor input data which is converted into a single sequence of patterned pulses connected to an input gate of the second switching transistor; and a second output demultiplexer located at said master interface and connected to receive a signal from said secondary winding of the second isolation transformer and providing for a reconstruction of said sensor input data to then be input to the programmable logic controller;

wherein the programmable logic controller can control and verify the position of the driver and stepper motor.

* * * * *